United States Patent Office 3,492,153
Patented Jan. 27, 1970

3,492,153
SILICON CARBIDE-ALUMINUM NITRIDE REFRACTORY COMPOSITE
Guy Ervin, Jr., Northridge, Calif., assignor to North American Rockwell Corporation, a corporation of Delaware
No Drawing. Filed Sept. 3, 1964, Ser. No. 394,316
Int. Cl. C23c 13/04
U.S. Cl. 117—106          6 Claims

ABSTRACT OF THE DISCLOSURE

A process for preparing a high density silicon carbide-aluminum nitride refractory composite by depositing aluminum nitride from the vapor state in the pores of a silicon carbide body. Preferably, aluminum nitride is formed in situ in the pores of the silicon carbide body by heating this body at a temperature between 1400 and 2200° C. in an atmosphere containing nitrogen and vaporized aluminum.

---

This invention relates to a high density silicon carbide-aluminum nitride refractory composite, and to a process for preparing such a composite.

Silicon carbide is a unique refractory material that is a well-known article of commerce and widely used for several special high temperature applications, e.g., as a rocket nozzle or as a high-temperature heating element. One limitation of silicon carbide for use as a rocket nozzle is the difficulty of obtaining silicon carbide of high density and consequent high strength as well as good corrosion resistance. When silicon carbide is used as a heating element, it undergoes gradual oxidation and deterioration at elevated temperatures.

Several suggestions have been made for improving the electrical, physical, and chemical properties of silicon carbide so as to provide greater uniformity in the electrical conductivity of silicon carbide electric resistance elements as well as improved durability and resistance to corrosion at elevated temperatures. Thus it has been proposed to prepare a refractory containing silicon carbide admixed with another refractory material such as aluminum nitride, this latter material being principally used as a crucible material for containing molten metals. In one proposed method, a sintered mass consisting of silicon carbide and aluminum nitride is prepared by mixing together silicon carbide and aluminum nitride and then heating the mixture to sinter it at a desired temperature. While a composite refractory prepared by such a method may afford some improvement over silicon carbide alone, there is insufficient improvement in density of the composite to provide improved strength, such as is required for a rocket nozzle. Also, non-uniform and variable results are obtained.

Accordingly, it is an object of the present invention to provide an improved high density, high strength refractory material.

It is another object to provide a high density refractory composite of silicon carbide as major component and aluminum nitride as minor component.

It is still another object to provide a high density refractory composite of silicon carbide impregnated with aluminum nitride having superior strength and oxidation resistance at elevated temperatures compared with silicon carbide alone.

It is yet another object to provide a method for preparing the foregoing refractory composite.

In accordance with the present invention, a high density refractory composite of silicon carbide and aluminum nitride is prepared by depositing aluminum nitride from the vapor state in the pores of a porous body of silicon carbide. This improved high density refractory composite is suitable for known present uses of either silicon carbide or aluminum nitride refractory materials alone, and additionally has superior strength and oxidation resistance compared with either of these refractory materials.

According to a preferred feature of this invention particularly suitable for commercial application, the porous silicon carbide body has a porosity of 15–50 volume percent and is maintained at an elevated temperature between 1400 and 2200° C. for about 15 minutes to 3 hours in an atmosphere containing aluminum and nitrogen in the vapor state. Aluminum nitride is formed in situ in the pores of the porous silicon carbide body substantially impregnating and filling these pores to form a high density composite of silicon carbide as major component and aluminum nitride as minor component, having a density at least 85% of theoretical and approaching the calculated theoretical density of 3.20 grams/cubic centimeter. It is particularly preferred for obtaining maximum density and consequent maximum strength to use a silicon carbide body having a porsity between 30 and 40 volume percent and maintain this body at a temperature between 1800 and 2200° C. while being exposed to aluminum vapor in a nitrogen atmosphere maintained at a nitrogen pressure of approximately one atmosphere.

In accordance with other aspects of this invention, aluminum nitride may be deposited from the vapor state in the pores of the porous silicon carbide body by a pyrolytic decomposition method in which porous silicon carbide is heated in the presence of a gaseous mixture of ammonia and aluminum trichloride, which react to deposit aluminum nitride on the hot silicon carbide surfaces. In another decomposition method for depositing aluminum nitride in the silicon carbide pores, the silicon carbide is heated, preferably to at least 1800° C., in an evacuated space containing some iodine vapor and aluminum metal at 300 to 400° C. Nitrogen is added as required to form aluminum nitride by reaction with aluminum iodide vapor which is transported to the hot silicon carbide surface.

The term "composite," as used herein, includes mixtures of grains of individual solid crystals as well as mixtures of silicon carbide-aluminum nitride solid solutions, and thus essentially homogeneous structures. Unless otherwise indicated, "composite" will therefore include a mixture of different types of crystals, mixtures of solid solutions, or combinations of both.

Silicon carbide is a well known article of commerce, whose high thermal conductivity and general chemical and physical stability makes it a valuable material for refractory use. Its main application in the electric field is in the use of silicon carbide resistors for electric furnace heating elements. Silicon carbide is manufactured in a resistance type electric furnace, the reaction being essentially a high temperature gas reaction in which silica is reacted with carbon to give silicon carbide and carbon monoxide. The sintered silicon carbide is available in various mesh sizes and porosities. In order to obtain a composite body of maximum density in accordance with the practice of this invention, it is preferred that the porosity of the silicon carbide be between 15 and 50 volume percent. Optimum results are obtained where the porosity lies between 30 and 40 volume percent, so that the final composite silicon carbide-aluminum nitride refractory contains a major portion of silicon carbide and a minor portion of aluminum nitride, and has a density at least 85% of the theoretical density and preferably approaching the theoretical density of 3.20. These high densities are not attainable by the pressing together of mixtures of silicon carbide and aluminum nitride, either by hot or cold pressing. Also, aluminum nitride composites containing up to 33% silicon carbide are available in powder form or as crucibles. However, these materials and crucibles are porous and relatively fragile.

Under preferred conditions of practicing this invention to obtain a body of maximum density, it is preferred that the vapor temperature of the aluminum and nitrogen be maintained between 1800 and 2200° C., in that lower temperatures require too long a reaction time and also result in the formation of a coarse crystalline aluminum nitride in the pores of the silicon carbide, thereby interfering with the attainment of a composite body of maximum density. Unduly high temperatures cause vaporization of aluminum nitride from the pores of the silicon carbide and thus result in a body of greater porosity.

Metallographic examination of the composite SiC-AlN refractory, and also the use of photomicrographic and X-ray diffraction techniques, show that there are present SiC-AlN solid solutions of varying composition, as well as other complex phases, with the aluminum nitride growing within the pores of the silicon carbide on the internal surfaces. The composite of silicon carbide and aluminum nitride is structurally very stable, apparently because of the close similarities in properties of SiC and AlN and of crystal mixtures or solid solutions of SiC and AlN. For example, the thermal expansion coefficient of silicon carbide in the temperature range 25–100° C. is $4.8 \times 10^{-6}$, and for aluminum nitride in the same temperature range, $5.6 \times 10^{-6}$. The aluminum nitride grows readily on the silicon carbide surface and adheres firmly to the surface because the two compounds have almost identical crystal structures. Each is of hexagonal structure, of the wurtzite type, and their lattice parameters and interatomic distances agree very closely.

Furthermore, the superior oxidation resistance of silicon carbide-aluminum nitride composites compared with the oxidation resistance of the individual compounds is apparently due to the nature of the oxide films which grow during oxidation under actual service condition. The oxide film on silicon carbide is silica, usually in the form of cristobalite, or sometimes silica glass, and this material has a thermal expansion much lower than that of the silicon carbide. For example, that of silica glass is approximately $0.5 \times 10^{-6}$. On the other hand, the oxide film on aluminum nitride, which is alumina, has a thermal coefficient of expansion that is much higher than that of the aluminum nitride, about $9 \times 10^{-6}$. But when the Sic-AlN composite or solid solution oxidizes, the oxide film formed is a glassy mixture of alumina and silica ($SiO_2$-$Al_2O_3$) or the compound mullite ($3Al_2O_3 \cdot 2SiO_2$), both of which have thermal expansions of approximately $5 \times 10^{-6}$ and hence very close to that of the base material. Thus the principal cause of oxidation failure, namely fragmentation of a protective oxide film caused by a poor match in thermal expansion between oxide and substrate, is eliminated in the refractory composite of SiC-AlN. Thus, the present invention provides a process for obtaining high density refractory bodies of improved strength and superior corrosion resistance.

The following examples illustrate this invention but are not to be construed as limitations thereof.

EXAMPLE 1

A porous body of silicon carbide consisting of a pre-sintered pellet of 30% porosity is mounted in a graphite crucible above a pool of aluminum metal contained in the base of the crucible. A silicon carbide pellet inside the graphite crucible is maintained at a temperature of 1800° C. for 60 minutes inside of an induction-heated furnace, with nitrogen gas being maintained therein at a controlled pressure of 730 mm. A silicon carbide-aluminum nitride composite having a porosity of 13 volume percent is obtained.

EXAMPLE 2

Using the apparatus of Example 1, but with a silicon carbide pellet having a porosity of 40 volume percent, the reaction is conducted at a temperature of 2000° C. for 40 minutes at a nitrogen pressure of 650 mm. The porosity of the SiC-AlN composite obtained is 13 volume percent.

Two samples of 85 to 90% of theoretical density prepared in accordance with the process of this invention were compared with two representative silicon carbide samples with respect to resistance to corrosion. The silicon carbide and silicon carbide-aluminum nitride samples were oxidized in air at 1000° C. for a period ranging to 500 hours. It was found that the silicon carbide-aluminum nitride samples had slopes of 0.160 and 0.195 when the depth of oxidation (in microns) was plotted versus time (in hours). Correspondingly, the silicon carbide samples had slopes of 0.213 and 0.275. Thus, from the lower slopes for the silicon carbide-aluminum nitride samples, the oxidation rate over long periods of time will be substantially less than that for silicon carbide. It should further be realized that in addition to the silicon carbide-aluminum nitride sample being superior to silicon carbide alone with respect to oxidation resistance, the principal advantageous effect expected under actual service conditions is also a greater resistance to spalling of the oxide film of the composite because of the much better thermal expansion match between the oxide film and the substrate.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In a method for preparing a high density refractory composite of silicon carbide as major component and aluminum nitride as minor component, the improvement which comprises heating a porous body of silicon carbide having from 15 to 50% porosity and depositing aluminum nitride from the vapor state in the pores of said heated body to form a high density refractory composite of higher density than the initial silicon carbide body.

2. The method of claim 1 wherein the silicon carbide body is heated to a temperature between 1400 and 2200° C.

3. The method of claim 2 wherein the deposited aluminum nitride is formed by the pyrolytic decomposition of a gaseous mixture of ammonia and aluminum trichloride.

4. The method of claim 2 wherein the deposited aluminum nitride is formed by the reaction of nitrogen with aluminum iodide vapor.

5. In a method for preparing a high density refractory composite of silicon carbide as major component and aluminum nitride as minor component, the improvement which comprises heating a porous body of silicon carbide having a porosity between 30 and 40% to a temperature between 1800° C. and 2200° C. in an atmosphere containing nitrogen and aluminum in the vapor state, and reacting said aluminum and nitrogen in the pores of said heated body in proportions to form aluminum nitride in situ whereby a high density refractory composite of silicon carbide and aluminum nitride is formed having a density of at least 85% of theoretical.

6. A refractory composite of silicon carbide as major component and aluminum nitride as minor component having a density of at least 85% of theoretical, said composite consisting essentially of a silicon carbide porous body having a coating of aluminum nitride on the surface of the pores thereof and at least a partial filling of said pores with aluminum nitride.

References Cited

UNITED STATES PATENTS

| | | |
|---|---|---|
| 2,406,275 | 8/1946 | Wejnarth. |
| 2,412,375 | 12/1946 | Wejnarth. |
| 2,412,376 | 12/1946 | Wejnarth. |
| 2,445,296 | 7/1948 | Wejnarth. |
| 2,839,413 | 6/1958 | Taylor. |
| 2,636,825 | 4/1953 | Nicholson _____ 106—44 |
| 3,084,060 | 4/1963 | Baer et al. _____ 117—107 |
| 3,259,509 | 7/1966 | Matkovich et al. _____ 106—44 |
| 3,305,372 | 2/1967 | Taylor _____ 106—44 |

TOBIAS E. LEVOW, Primary Examiner

W. R. SATTERFIELD, Assistant Examiner

U.S. Cl. X.R.

106—44; 117—169; 252—516